US006782349B2

(12) United States Patent
Challener et al.

(10) Patent No.: US 6,782,349 B2
(45) Date of Patent: Aug. 24, 2004

(54) METHOD AND SYSTEM FOR UPDATING A ROOT OF TRUST MEASUREMENT FUNCTION IN A PERSONAL COMPUTER

(75) Inventors: David Carroll Challener, Raleigh, NC (US); Chad Lee Gettelfinger, Durham, NC (US); Steven Dale Goodman, Raleigh, NC (US); Hernando Ovies, Cary, NC (US); Randall Scott Springfield, Chapel Hill, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 10/063,608

(22) Filed: May 3, 2002

(65) Prior Publication Data

US 2003/0208338 A1 Nov. 6, 2003

(51) Int. Cl.[7] .............................. G06F 19/00; H04L 9/32
(52) U.S. Cl. ........................ 702/186; 713/187; 713/191; 713/193
(58) Field of Search ........................ 702/186; 713/187, 713/191, 193, 194, 100, 1

(56) References Cited

U.S. PATENT DOCUMENTS

| | | | |
|---|---|---|---|
| 5,231,666 A | 7/1993 | Matyas ........................ 380/25 |
| 5,432,939 A | 7/1995 | Blackledge, Jr. et al. ... 395/700 |
| 5,544,322 A | 8/1996 | Cheng et al. .......... 395/200.12 |
| 5,701,492 A | 12/1997 | Wadsworth et al. .......... 395/12 |
| 5,844,986 A | 12/1998 | Davis ............................. 380/4 |
| 5,903,732 A | 5/1999 | Reed et al. ............ 395/200.59 |
| 5,925,123 A | 7/1999 | Tremblay et al. ........... 712/212 |
| 5,956,715 A | 9/1999 | Glasser et al. .................. 707/9 |
| 5,964,873 A | * 10/1999 | Choi .............................. 713/2 |
| 6,018,806 A | 1/2000 | Cortopassi et al. ............. 714/8 |
| 6,061,684 A | 5/2000 | Glasser et al. .................. 707/9 |
| 6,148,387 A | 11/2000 | Galasso et al. ............. 711/203 |
| 6,185,678 B1 * | 2/2001 | Arbaugh et al. ................ 713/2 |
| 6,266,809 B1 * | 7/2001 | Craig et al. .................. 717/173 |
| 6,292,569 B1 | 9/2001 | Shear et al. ................. 380/255 |
| 6,308,173 B1 | 10/2001 | Glasser et al. .................. 707/9 |
| 6,560,706 B1 * | 5/2003 | Carbajal et al. ............. 713/155 |
| 6,625,730 B1 * | 9/2003 | Angelo et al. .................. 713/2 |

(List continued on next page.)

FOREIGN PATENT DOCUMENTS

| JP | 5216639 A | 8/1993 | ............. G06F/9/06 |
|---|---|---|---|
| WO | WO019317 | 4/2000 | ........... G06F/11/14 |

OTHER PUBLICATIONS

"TCQ PC Specific Implementation Specification" from Internet web site: www.trustedcomputing.org dated Sep. 9, 2001.*
R. Bealkowski, D. S. Cronk and M. R. Turner, "Recovery Method for Damaged Firmware," *IBM Technical Disclosure Bulletin*, p. 551, vol. 38, No. 07, Jul. 1995,.
C. R. Kir and S. T. Ross, "Fully Reprogrammable Fault–Tolerant Flash Memory System," *IBM Technical Disclosure Bulletin*, pp. 83–86, vol. 38, No. 08, Aug. 1995.
HC Lin, SJ Palte, M Esfandiary, S Dunham, "%INC% Data Processing System and Method Supporting Reliable Updates to Boot Code", *IBM Dosier RPS9–1999–0061*.

*Primary Examiner*—Patrick Assouad
(74) *Attorney, Agent, or Firm*—Sawyer Law Group LLP (57) ABSTRACT

A method and system for updating a root of trust measurement (RTM) function in a personal computer is disclosed. The RTM function is located in a boot block of the personal computer. The method and system comprise initializing a request to update the RTM function and unlocking the boot block based on an authentication process. The method and system further includes updating the RTM function. Through the use of the method and system in accordance with the present invention, the RTM function in a personal computer is updated in a manner that ensures that the update is authentic.

34 Claims, 6 Drawing Sheets

U.S. PATENT DOCUMENTS

| | | | |
|---|---|---|---|
| 2002/0004905 A1 * | 1/2002 | Davis et al. | 713/193 |
| 2002/0174353 A1 * | 11/2002 | Lee | 713/193 |
| 2003/0028766 A1 * | 2/2003 | Gass et al. | 713/164 |
| 2003/0037246 A1 * | 2/2003 | Goodman et al. | 713/191 |
| 2003/0056107 A1 * | 3/2003 | Cammack et al. | 713/189 |
| 2003/0074548 A1 * | 4/2003 | Cromer et al. | 713/1 |
| 2003/0084278 A1 * | 5/2003 | Cromer et al. | 713/2 |
| 2003/0084307 A1 * | 5/2003 | Schwartz | 713/189 |
| 2003/0084342 A1 * | 5/2003 | Girard | 713/201 |
| 2003/0097581 A1 * | 5/2003 | Zimmer | 713/200 |
| 2003/0135727 A1 * | 7/2003 | Challener et al. | 713/2 |
| 2003/0140238 A1 * | 7/2003 | Turkboylari | 713/193 |
| 2003/0182561 A1 * | 9/2003 | Challener et al. | 713/189 |
| 2003/0188179 A1 * | 10/2003 | Challener et al. | 713/193 |
| 2003/0196085 A1 * | 10/2003 | Lampson et al. | 713/156 |
| 2003/0196110 A1 * | 10/2003 | Lampson et al. | 713/200 |

* cited by examiner

METHOD AND SYSTEM FOR UPDATING A ROOT OF TRUST MEASUREMENT FUNCTION IN A PERSONAL COMPUTER

FIELD OF INVENTION

The present invention relates generally to the field of computer security and particularly a method and system for securely updating a root of trust measurement.

BACKGROUND OF THE INVENTION

Figure 1:
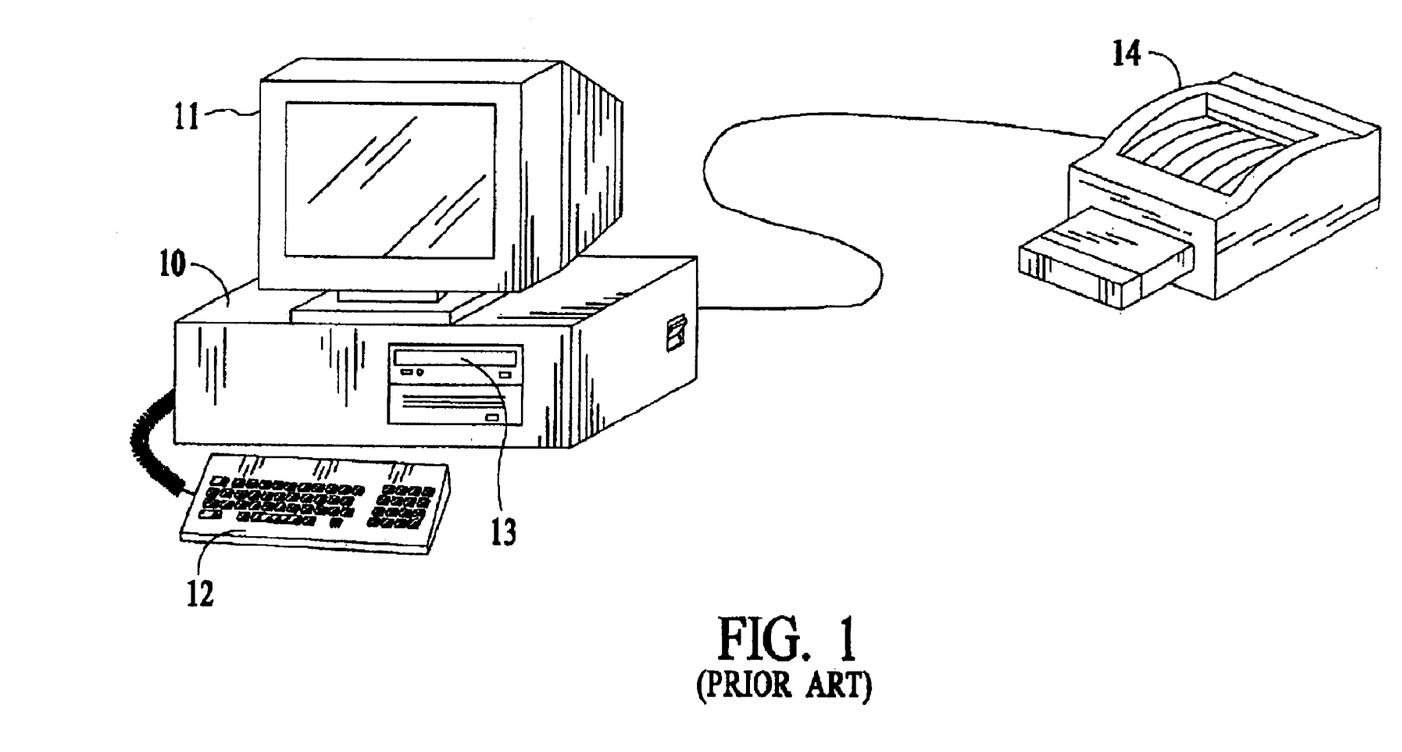
FIG. 1 is an example of a typical personal computer system.

Personal computer systems in general have attained widespread use for providing computer power to many segments of today's modern society. Personal computer systems can usually be defined as a desktop, floor standing, or portable microcomputer that comprises a system unit having a single system processor and associated volatile and non-volatile memory. FIG. 1 is an example of a conventional personal computer system 10. The personal computer system 10 typically includes an associated display monitor 11, a keyboard 12, one or more diskette drives 13 and an associated printer 14.

With the phenomenal growth and use of personal computers in the world in recent years, more and more data or information is being collected and retained or stored in such systems. Oftentimes data is sensitive in nature. As more users recognize the sensitive nature of data and its value, the more it becomes desirable to protect against such misuse. In light of this, the level, or "amount", of security upon which a great deal of the information depended, needed to be increased. At the same time, security parameters for PC's needed to be easy to deploy, use and manage.

One of these parameters relates to the Root of Trust Measurement (RTM) function. The RTM function describes the code function that makes the first measurement of the BIOS code. Typically, it is the first module that is executed by the Basic-Input-Output System (BIOS). This is also what is referred to as the boot block. Originally, many computer security guidelines stipulated that the RTM function could not be changed under any circumstances due to the sensitive nature of the function. However, because the boot block performs other functions, such as recovery of the system in the case of a BIOS corruption issue, the RTM function may need to be updated. Recognizing this, the RTM function is now allowed to be updated, but only in a manner that ensures that the update is authentic.

Accordingly, what is needed is a method and system for securely updating the root of trust measurement function. The method and system should be simple, cost effective and capable of being easily adapted to current technology. The present invention addresses such a need.

SUMMARY OF INVENTION

A method and system for updating a root of trust measurement (RTM) function in a personal computer is disclosed. The RTM function is located in a boot block of the personal computer. The method and system comprise initializing a request to update the RTM function and unlocking the boot block based on an authentication process. The method and system further includes updating the RTM function.

Through the use of the method and system in accordance with the present invention, the RTM function in a personal computer is updated in a manner that ensures that the update is authentic.

DETAILED DESCRIPTION

The present invention provides a method and system for updating a root of trust measurement function in a personal computer. The following description is presented to enable one of ordinary skill in the art to make and use the invention and is in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention is presented in the context of a preferred embodiment. The preferred embodiment of the present invention is a method and system for updating a root of trust measurement function in a personal computer. Through the use of the method and system in accordance with the present invention, the RTM function in a personal computer is updated in a manner that ensures that the update is authentic.

Such a method may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for updating a root of trust measurement function in a personal computer.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional hard drive or a RAID array), magnetic tape, electronic read-only memory, an optical storage device (e.g., CD ROM, WORM, DVD, digital optical tape), paper punch cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

In many computer platforms, trusted information such as private keys, digital certificates, random number generators, protected storage and the Root-of-Trust Measurement, reside on two hardware chips within the platform, the Trusted Platform Module (TPM) and the POST/BIOS Module.

Figure 2:
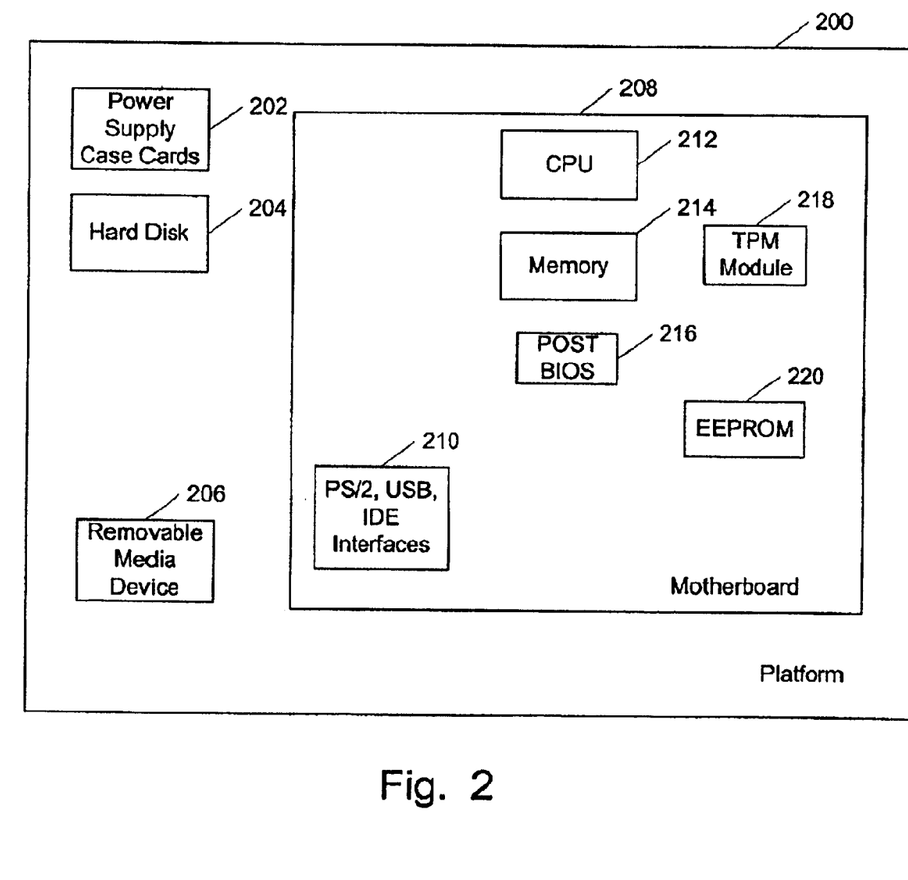
FIG. 2 shows a system in accordance with the present invention.

For a better understanding, please refer now to FIG. 2. FIG. 2 shows an example of a computer platform 200. The platform 200 comprises power supply case cards 202, a hard disk 204, a removable media device 206, and a motherboard 208. The motherboard 208 comprises Universal Serial Bus (USB) and Integrated Drive Electronics (IDE) Interfaces 210, a central processing unit 212, a computer memory 214, the POST/BIOS executable code 216, the TPM Module 218, and a secure communications buffer 220.

The POST/BIOS executable code 216 preferably comprises the bootblock/RTM module and the secure communications buffer 220 comprises an Erasable Electrically Programmable Read Only Memory (EEPROM) which may be locked down hard thereby requiring a reset to unlock, during the power on sequence before the operating system is started.

Figure 3:
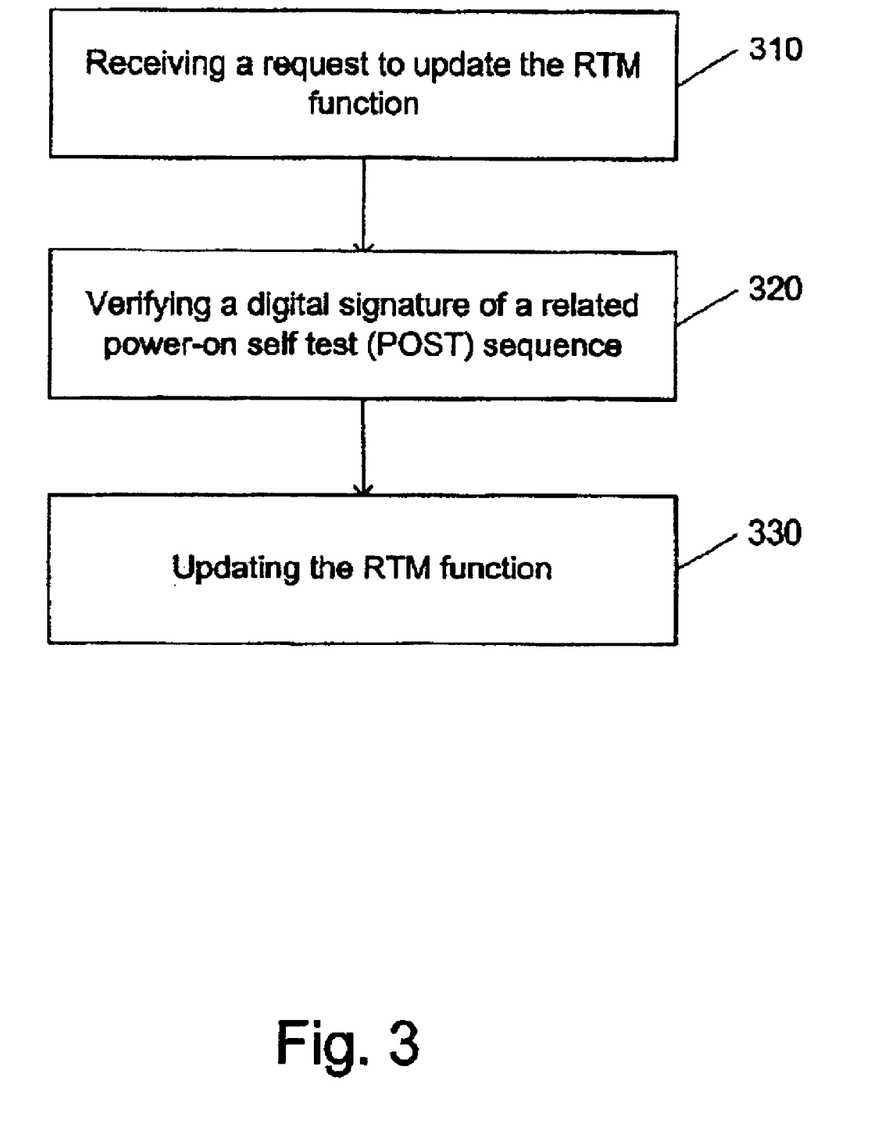
FIG. 3 is a high level flowchart of the method in accordance with the present invention.

To further understand the method in accordance with the present invention, please refer now to FIG. 3. FIG. 3 is a high level flowchart of the method in accordance with the present invention. First, a request to update the RTM function is initialized, via step 310. Preferably, this request is initialized by a series of steps performed by a flash utility. Also, the update to the RTM function preferably comprises replacing the existing RTM function with a new RTM function. Next, the boot block within the POST/BIOS remains unlocked, via step 320. Preferably, this is done after the execution of an authentication algorithm that takes place in the boot block. Finally, the RTM function is updated, via step 330. Preferably, step 330 is accomplished via a series of steps performed by the POST code.

Although the preferred embodiment of the present invention is described in the context of being utilized in conjunction with any personal computer, one of ordinary skill in the art will readily recognize that the associated functionality could be implemented based on specified computer security guidelines while remaining within the spirit and scope of the present invention. For example, the Trusted Computing Platform Alliance (TCPA) is an open alliance formed by a small group of companies that administrate specific computer security guidelines. Accordingly, the method and system in accordance with the present invention could be implemented in accordance with TCPA guidelines.

The process begins when a flash utility makes a request to update the RTM function. For the purposes of this patent application, a flash utility comprises a remote entity that builds a file of the request on a diskette, hardfile or other suitable local storage media. Since the code for the RTM function is located in the boot block of a computer system and the boot block is normally locked to prevent tampering, the flash utility cannot directly update the RTM function. Accordingly, once the flash utility builds the file the flash utility passes the request, along with a pointer to the file, to the current boot block. Preferably, the request is passed via the secure communication buffer.

At this time the flash utility may update the remainder of the POST/BIOS using the normal processes. The computer is then rebooted. Upon reboot, the current boot block will detect the update request and will authenticate the digital signature of the POST routines used for the update. If the signature is authentic, the POST sequence will continue with the boot block unlocked. Otherwise, the boot block remains locked prior to continuing the POST sequence.

Once the POST sequence begins, the POST code will detect the update request and authenticate the request. Once the request is authenticated, the POST code will check the signature of the new RTM function. If either the request authentication or the signature check fails, the POST code will lock the boot block, report the error, and ignore the request. Once both the authenticity of the request and the validity of the new RTM function are established, the POST code will update the RTM function. Upon completion of the update, the system will reboot to force the new RTM function to execute prior to loading an operating system.

Figure 4:
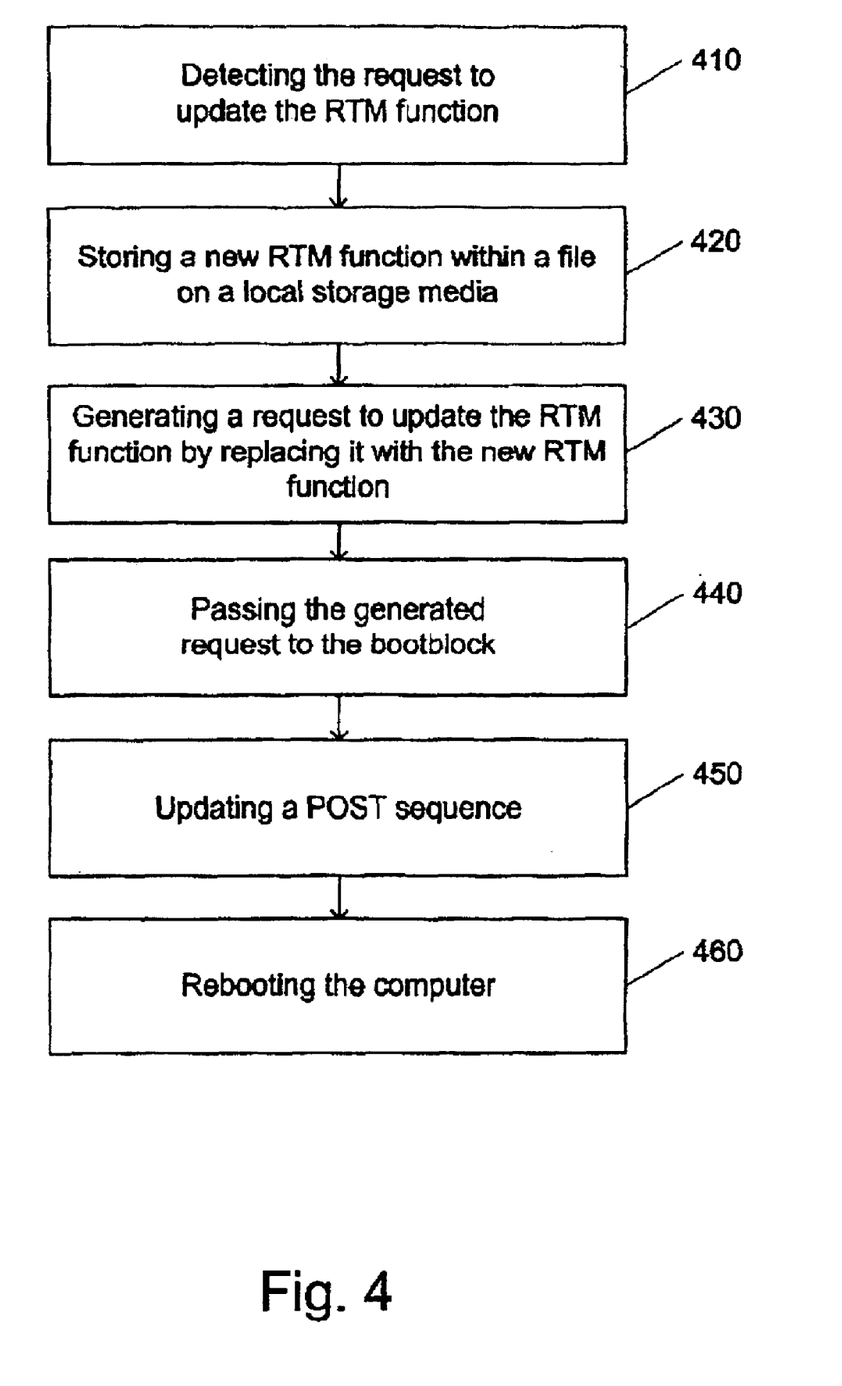
FIG. 4 is a flowchart of the flash utility processing algorithm.

As previously articulated, the method in accordance with the present invention preferably comprises the performance of a series of steps by the flash utility, followed by the performance of a series of steps by the boot block, followed by the performance of a series of steps by the POST code. For a better understanding, please refer to FIGS. 4–6. FIG. 4 is a flowchart of the flash utility processing algorithm, FIG. 5 is a flowchart of the boot block processing algorithm and FIG. 6 is a flowchart of the POST processing algorithm.

Please refer now to FIG. 4. First, a request to update the RTM function is detected, via step 410. Next, the new RTM function is stored within a file on a local storage media, via step 420. Preferably, the local storage media comprises a diskette or a hardfile. The request to update the RTM function is then passed to the boot block, via step 430. Preferably, this request is passed to the boot block, along with a pointer to the file, via a secure communication buffer. The remainder of the POST/BIOS is then updated, via step 440. Finally, the computer is rebooted, via step 450.

Figure 5:
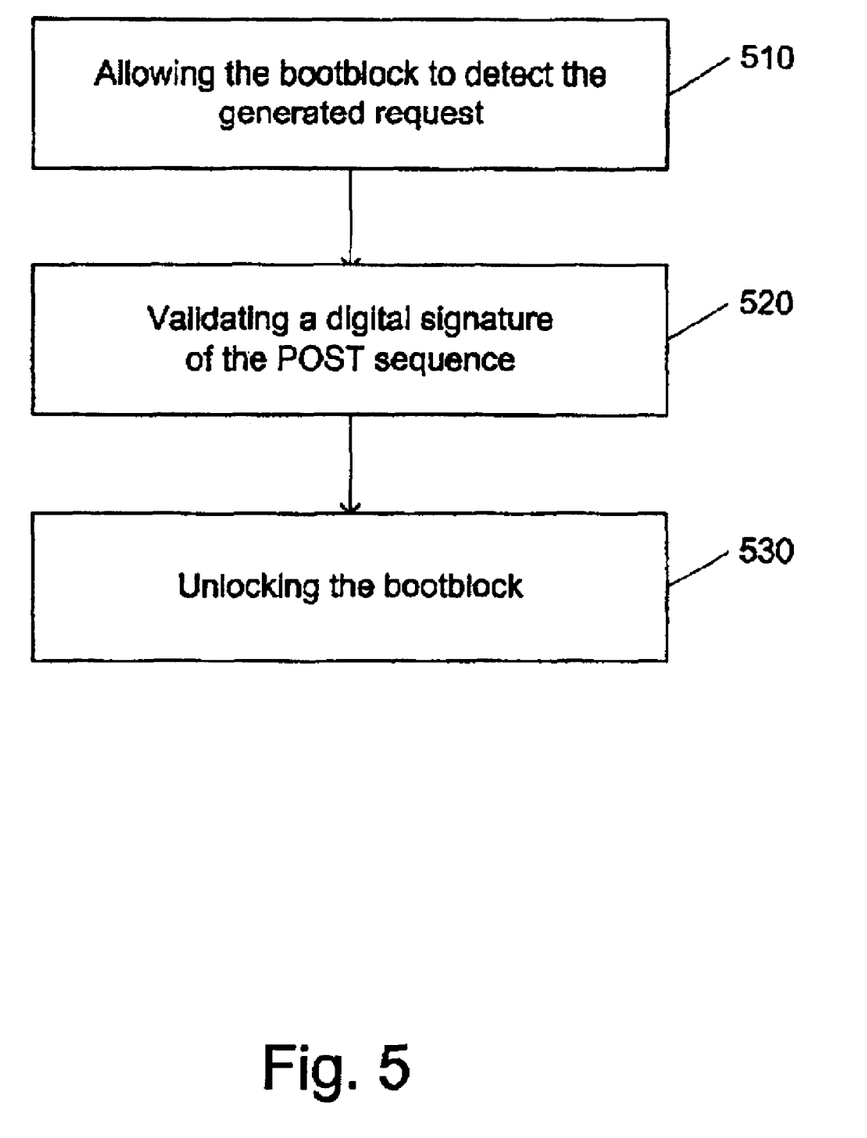
FIG. 5 is a flowchart of the boot block processing algorithm.

For a more detailed understanding of the present invention, please refer now to FIG. 5. FIG. 5 is a flowchart of the boot block processing algorithm. First, the RTM function detects the request to update the RTM function, via step 510. Next, the digital signature of the updated POST/BIOS routines is authenticated, via step 520. Finally, if the digital signature is authentic, the boot block remains unlocked, via 530. It should be noted that the boot block will be locked prior to continuing the POST sequence if the digital signature is not validated.

Figure 6:
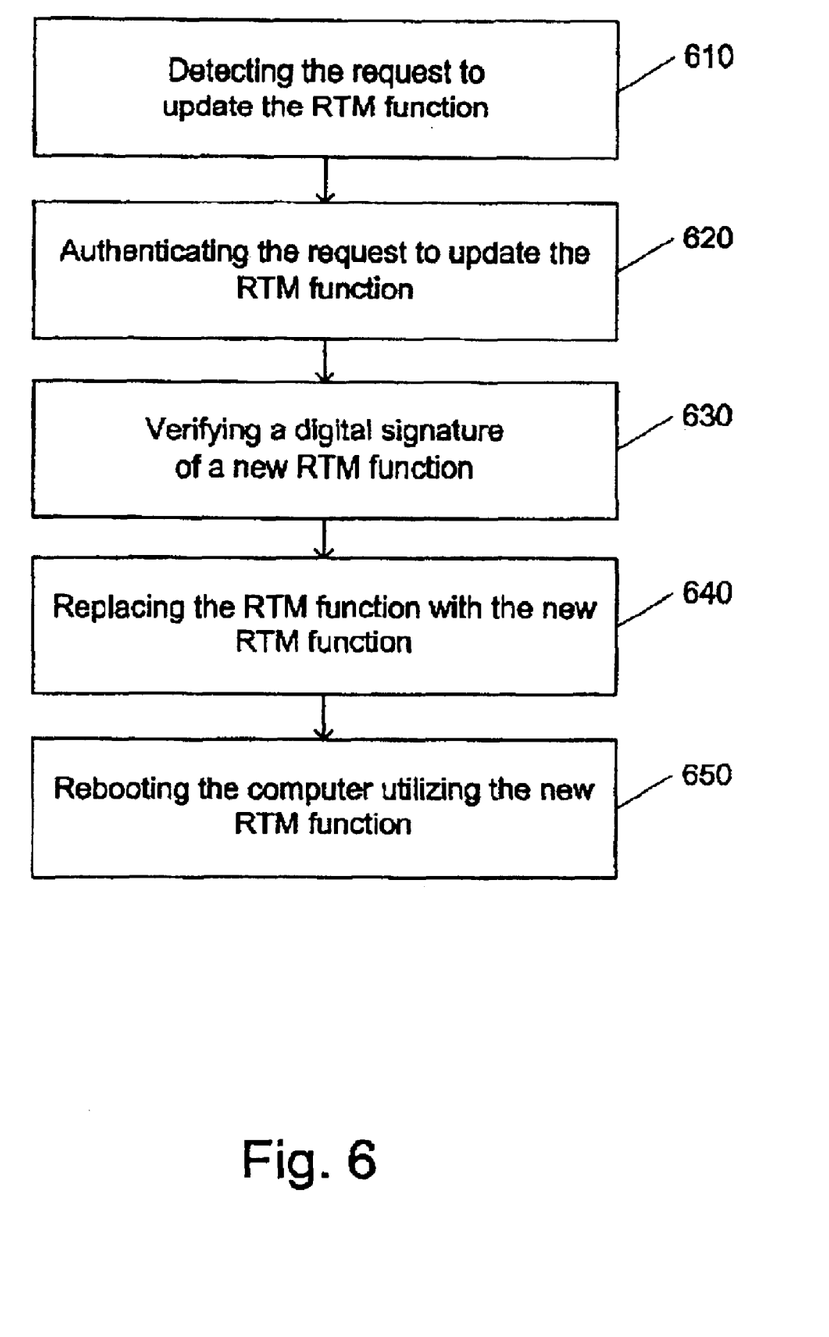
FIG. 6 is a flowchart of the POST processing algorithm.

For an even more detailed understanding of the present invention, please refer now to FIG. 6. FIG. 6 is a flowchart of the POST processing algorithm. First, the request to update the RTM function is detected by the POST code, via step 610. Next, the request to update the RTM function is authenticated, via step 620. Next, the new RTM function is accessed and the digital signature thereof is verified, via step 630. It should be noted that if either the request authentication or the signature check fails, the POST code will lock the boot block, report the error, and ignore the request. Once the digital signature is verified, the RTM function is updated with the new RTM function, via step 640. Finally, the computer system is rebooted, via step 650. This is done to force the new RTM function to execute prior to loading an operating system.

A method and system for updating a root of trust measurement function in a personal computer is disclosed. Through the use of the method and system in accordance with the present invention, the RTM function in a personal computer is updated in a manner that ensures that the update is authentic.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for updating a root of trust measurement (RTM) function in a personal computer, the RTM function being located in a boot block of the personal computer, the method comprising the steps of:

a) initializing a request to update the RTM function, wherein step a) further comprises:
   a1) detecting the request to update the RTM function; and
   a2) storing a new RTM function within a file on a local storage media;
b) unlocking the boot block based on an authentication process; and
c) updating the RTM function.

2. The method of claim 1 wherein the local storage media comprises a diskette or a hardfile.

3. The method of claim 2 wherein step a) further comprises:
   a3) passing the request to the boot block;
   a4) updating a POST sequence; and
   a5) rebooting the computer.

4. The method of claim 3 wherein step a3) further comprises:
   a3i) passing the request and a pointer to the file via a secure communications buffer within the computer.

5. The method of claim 1 wherein step b) further comprises:
   b1) allowing the boot block to detect the request;
   b2) authenticating a digital signature of a POST sequence related to the request; and
   b3) allowing the boot block to remain unlocked.

6. The method of claim 4 wherein step b) further comprises:
   b1) allowing the boot block to detect the request;
   b2) authenticating a digital signature of the POST sequence used in step a5); and
   b3) allowing the boot block to remain unlocked.

7. The method of claim 1 wherein step c) further comprises:
   c1) detecting the request to update the RTM function;
   c2) authenticating the request to update the RTM function; and
   c3) verifying a digital signature of a new RTM function.

8. The method of claim 7 wherein step c) further comprises:
   c4) replacing the RTM function with the new RTM function; and
   c5) rebooting the computer utilizing the new RTM function.

9. The method of claim 6 wherein step c) further comprises:
   c1) detecting the request to update the RTM function;
   c2) authenticating the request to update the RTM function; and
   c3) verifying a digital signature of a new RTM function.

10. The method of claim 9 wherein step c) further comprises:
    c4) replacing the RTM function with the new RTM function; and
    c5) rebooting the computer utilizing the new RTM function.

11. The method of claim 10 wherein the personal computer is a Trusted Computing Platform Alliance (TCPA) compliant personal computer.

12. A system for updating a root of trust measurement (RTM) function in a personal computer, the RTM function being located in a boot block of the personal computer, comprising:

means for initializing a request to update the RTM function, wherein the means for initializing a request further comprises:

means for detecting the request to update the RTM function; and means for storing a new RTM function within a file on a local storage media;

means for unlocking the boot block based on an authentication process; and means for updating the RTM function.

13. The system of claim 12 wherein the local storage media comprises a diskette or a hardfile.

14. The system of claim 13 wherein the means for initializing a request further comprises:

means for passing the request to the boot block;

means for updating a POST sequence; and means for rebooting the computer.

15. The system of claim 14 the means for passing the request to the boot block further comprises:

means for passing the request and a pointer to the file via a secure communications buffer within the computer.

16. The system of claim 12 wherein the means for initializing a request further comprises:

means for allowing the boot block to detect the request;

means for authenticating a digital signature of a POST sequence related to the request; and means for allowing the boot block to remain unlocked.

17. The system of claim 15 wherein the means for initializing a request further comprises:

means for allowing the boot block to detect the request;

means for authenticating a digital signature of the POST sequence.

18. The system of claim 12 wherein the means for updating the RTM function further comprises:

means for detecting the request to update the RTM function;

means for authenticating the request to update the RTM function; and means for checking a digital signature of a new RTM function.

19. The system of claim 18 wherein the means for updating the RTM function further comprises:

means for replacing the RTM function with the new RTM function; and means for rebooting the computer utilizing the new RTM function.

20. The system of claim 17 wherein the means for updating the RTM function further comprises:

means for detecting the request to update the RTM function;

means for authenticating the request to update the RTM function; and means for checking a digital signature of a new RTM function.

21. The system of claim 20 wherein the means for updating the RTM function further comprises:

means for replacing the RTM function with the new RTM function; and means for rebooting the computer utilizing the new RTM function.

22. The system of claim 21 wherein the personal computer is a Trusted Computing Platform Alliance (TCPA) compliant personal computer.

23. A computer readable medium containing program instructions for updating a root of trust measurement (RTM) function in a personal computer, the RTM function being located in a boot block of the personal computer, the program instructions for:

a) initializing a request to update the RTM function;

b) allowing the boot block to remain unlocked based on an authentication process; and c) updating the RTM function.

24. The computer readable medium of claim 23 wherein step a) further comprises:

a1) detecting the request to update the RTM function; and a2) storing a new RTM function within a file on a local storage media.

25. The computer readable medium of claim 24 wherein the local storage media comprises a diskette or a hardfile.

26. The computer readable medium of claim 25 wherein step a) further comprises:

a3) passing the request to the boot block;

a4) updating a POST sequence; and a5) rebooting the computer.

27. The computer readable medium of claim 26 wherein step a3) further comprises:

a3i) passing the request and a pointer to the file via a secure communications buffer within the computer.

28. The computer readable medium of claim 23 wherein step b) further comprises:

b1) allowing the boot block to detect the request;

b2) authenticating a digital signature of a POST sequence related to the request; and b3) allowing the boot block to remain unlocked.

29. The computer readable medium of claim 28 wherein step b) further comprises:

b1) allowing the boot block to detect the request;

b2) authenticating a digital signature of the POST sequence used in step a5); and b3) allowing the boot block to remain unlocked.

30. The computer readable medium of claim 23 wherein step c) further comprises:

c1) detecting the request to update the RTM function;

c2) authenticating the request to update the RTM function; and c3) verifying a digital signature of a new RTM function.

31. The computer readable medium of claim 30 wherein step c) further comprises:

c4) replacing the RTM function with the new RTM function; and c5) rebooting the computer utilizing the new RTM function.

32. The computer readable medium of claim 29 wherein step c) further comprises:

c1) detecting the request to update the RTM function;

c2) authenticating the request to update the RTM function; and c3) verifying a digital signature of a new RTM function.

33. The computer readable medium of claim 32 wherein step c) further comprises:

c4) replacing the RTM function with the new RTM function; and c5) rebooting the computer utilizing the new RTM function.

34. The computer readable medium of claim 33 wherein the personal computer is a Trusted Computing Platform Alliance (TCPA) compliant personal computer.

* * * * *